(12) United States Patent
Rao et al.

(10) Patent No.: US 7,516,125 B2
(45) Date of Patent: *Apr. 7, 2009

(54) PROCESSOR FOR FAST CONTEXTUAL SEARCHING

(75) Inventors: Ramana B. Rao, San Francisco, CA (US); Swapnil Hajela, Fremont, CA (US); Nareshkumar Rajkumar, San Jose, CA (US)

(73) Assignee: Business Objects Americas, San Jose, CA (US)

( * ) Notice: Subject to any disclaimer, the term of this patent is extended or adjusted under 35 U.S.C. 154(b) by 433 days.

This patent is subject to a terminal disclaimer.

(21) Appl. No.: 11/391,890

(22) Filed: Mar. 29, 2006

(65) Prior Publication Data

US 2007/0027854 A1 Feb. 1, 2007

Related U.S. Application Data

(60) Provisional application No. 60/704,358, filed on Aug. 1, 2005.

(51) Int. Cl.
G06F 7/00 (2006.01)
G06F 17/30 (2006.01)

(52) U.S. Cl. ........................................................ 707/3
(58) Field of Classification Search ................ 707/3–5, 707/102, 104.1
See application file for complete search history.

(56) References Cited

U.S. PATENT DOCUMENTS

| | | | | |
|---|---|---|---|---|
| 5,265,065 A | * | 11/1993 | Turtle | 707/4 |
| 5,418,948 A | * | 5/1995 | Turtle | 707/4 |
| 5,704,060 A | * | 12/1997 | Del Monte | 707/104.1 |
| 5,778,361 A | * | 7/1998 | Nanjo et al. | 707/5 |
| 6,654,717 B2 | | 11/2003 | Loofbourrow et al. | |
| 7,149,748 B1 | * | 12/2006 | Stephan | 707/102 |
| 2003/0069880 A1 | * | 4/2003 | Harrison et al. | 707/3 |
| 2004/0230598 A1 | | 11/2004 | Robertson et al. | |

OTHER PUBLICATIONS

"Fast Phrase Querying With Combined Indexes", ACM Journal Name, vol. V, No. N, Month 200yy.*
"Efficient Phrase Querying with an Auxiliary Index", 2001, ACM.*
Contributors to the Dictionary of Algorithms and Data Structures, NIST, Black, P.E., ed., http://www.nist.gov/dads/Other/contrib.html (1-3)Jun. 27, 2005.
Author(s), "inverted index," Dictionary of Algorithms and Data Structures, NIST, Black, P.E., ed., http://www.nist.gov/dads/HTML/InvertedIndex.html (1-2)Jun. 27, 2005.

(Continued)

*Primary Examiner*—Hung T Vy
(74) *Attorney, Agent, or Firm*—Cooley Godward Kronish LLP

(57) ABSTRACT

Words having selected characteristics in a corpus of documents are found using a data processor arranged to execute queries. Memory stores an index structure in which entries in the index structure map words and marks for words having the selected characteristics to locations within documents in the corpus. Entries in the index structure represent words and other entries represent marks with the location information of a marked word. The entries for the marks can be tokens coalesced with prefixes of respective marked words or adjacent. A query processor forms a modified query by adding a mark for a word to the query. The processor executes the modified query.

27 Claims, 5 Drawing Sheets

OTHER PUBLICATIONS

Author(s), "prefix," Dictionary of Algorithms and Data Structures, NIST, Black, P.E., ed., http://www.nist.gov/dads/HTML/prefix.html Jun. 27, 2005.

Author(s), "suffix," Dictionary of Algorithms and Data Structures, NIST, Black, P.E., ed., http://www.nist.gov/dads/HTML/prefix.html Jun. 27, 2005.

CRC-A, "suffix array," Dictionary of Algorithms and Data Structures, NIST, Black, P.E., ed., http://www.nist.gov/dads/HTML/suffix.html Jun. 27, 2005.

Williams, H.E. et al., "Fast Phrase Querying With Combined Indexes," ACM Transactions of Information Systems, vol. 22, No. 4, Oct. 2004, pp. 573-594.

"Understanding Query Expressions," Oracle ConText Option Application Developer's Guide, Rel..3, http://www.Isbu.ac.uk/oracle/oracle7/server/doc/CO20APP/ch03.htm(1-47) Jun. 8, 2005.

Scholer, F. et al., "Compression of Inverted Indexes For Fast Query Evaluation," School of Computer Science and Information Technology, RMIT Univ., Melbourne, AU 2001 8pp, no month.

Williams, H.E. et al., "Fast Phrase Querying With Combined Indexes," presentation by Search Engine Group, RMIT Univ. Computer Science, no month, year.

Bahle, D. et al., "Efficient Phrase Querying with an Auxiliary Index," School of Computer Science and Information Technology, RMIT Univ., Melbourne, AU 2001 7pp, no month.

International Search Report issued in corresponding International Application No. PCT/US2006/028939.

* cited by examiner

DOCUMENT 1.

The[1] University[2] of[3] Alabama[4] is[5] quite[6] a[7] huge[8] college[9].

Fig. 2

DOCUMENT 2.

The[1] Guns[2] of[3] Navarone[4] is[5] a[6] classic[7].

Fig. 3

PROCESSOR FOR FAST CONTEXTUAL SEARCHING

CROSS-REFERENCE TO RELATED APPLICATION

The benefit of U.S. Provisional Application No. 60/704,358; filed 1 Aug. 2005, entitled PROCESSOR FOR FAST PHRASE SEARCHING, is hereby claimed.

BACKGROUND OF THE INVENTION

1. Field of the Invention

The present invention relates to search engines for handling contextual queries over a set of documents.

2. Description of Related Art

Search engines often include features that allow a user to find words in specific contexts. For example, words used in a common field (abstract, title, body, etc.) in documents that make up the corpus being searched are often subject of queries. Some search engines are set up to search for words used in grammatical contexts, such as subjects or objects in sentences. For documents written in markup languages, such as XML or HTML, words used that are parts of tags can be searched for using search engines. Search engines have also been implemented to search for words used as part of an entity name, like the name of a person, place or product.

Also, search engines routinely encounter the problem of handling very frequent words independent of context, referred to as stop words. Stop words like "the", "of", "and", "a", "is", "in" etc., occur so frequently in the corpus of documents subject of a search index that reading and decoding them at query time becomes a very time-consuming operation. Most search engines therefore drop these words during a keyword query and hence the name "stopwords." However, for a search engine to support phrase queries, these stop words must be evaluated. As an example, consider a phrase query like "University of Georgia". This query must return with documents matching all the three words in the same order. Therefore, the search engine must deal with the stop word "of".

In a survey of web server search logs, it has been found that 20% of all phrase queries contain a frequently occurring word like "the", "to", "of" etc. Thus, solving this issue of phrase query performance is paramount to any search engine. Likewise, contextual searching occupies a significant proportion of the queries for many types of search engines.

Performance of phrase queries and other contextual searches presents serious challenges indexes used for various searchable contexts and for stop words occupy a significant percentage of the search index data on disk. This taxes system performance in 3 ways:

Disk performance on large disk reads from the indexes becomes a serious bottleneck.

System processor performance in decompressing this data fetched from the indexes gets impacted.

System memory usage is also increased.

Different methodologies can be used to speed up phrase queries. One method is to use specialized indexes called skip lists that allow selective access of the index postings. This method has the unfortunate side effect of further increasing both the index size and the complexity of the indexing engine.

Another technique that can be used for stop words is called "next word indexing". In this technique, words following stop words are coalesced with the stop word into one word and stored as a separate word in the index. For instance, in the sentence fragment "The Guns of Navarone" in a document, making an index entry by coalescing the stop words and their subsequent words creates the new words "TheGuns" and "ofNavarone". These words are stored separately in the index. For a phrase query "The Guns of Navarone", the search engine converts the four-word query into a 2-word phrase query "The Guns ofNavarone". The speed up is enormous here as the number of postings for the word "TheGuns" and "ofNavarone" will be quite small when compared to that for the words "The" and "of".

There is a mechanism of "next-word" indexes (also referred as Combined indexes) published by Hugh E. Williams, Justin Zobel, Dirk Bahle, "Fast Phrase Querying with Combined Indexes," Search Engine Group, School of Computer Science and Information Technology, RMIT University, GPO Box 2476V, Melbourne 3001, Australia. 1999.

This next-word indexing technique, though very interesting, is not preferable because it can increase the number of unique words in the search engine by more than a few million entries. This creates slowdowns both in indexing and querying.

Traditionally contextual matching requires multiple index structures over the documents which consume significant resources. The problem is exacerbated when complex matching is needed, over several contextual parameters and stop words.

It is desirable to provide systems and methods for speeding up the indexing and querying processes for search engines, and to otherwise make more efficient use of processor resources during indexing and querying large corpora of documents.

SUMMARY OF THE INVENTION

The present invention provides a method and system for contextual matching based on preprocessing a corpus to insert marks on words, and in some embodiments, coalescing the mark with a prefix, such as the first letter, from the marked word to create a specialized internal token. The marks identify a characteristic of the marked word, such as a context for the word. Thus the input corpus is can be represented by a sequence of arbitrary tokens, many of which may indeed represent actual words in a human language. Other than these "words," other tokens represent "marks" that apply to the adjacent word(s). These marks represent other features of the words, including contextual features, determined during preprocessing or to constrain the words to a particular context.

For example, in the sentence fragment "The Guns of Navarone", indexing can treat the stop words as marks and thus index internal tokens "TheG" and "ofN" with the same positional information as the stop words, "The" and "of", thus facilitating matching of these stop words in the context of words beginning with a prefix letter. More than one mark can also be associated with one word in a document, if desired, for example each of the words can be marked as being part of the title of a document. The special internal tokens are stored as part of the index in a manner that disambiguates them from normal words. Now, when the same phrase is entered as a query, the query is modified for searching to the modified phrase "TheG title_G Guns ofN title_N Navarone". The speedup in searching is enormous here as the size of the data for "TheG", "ofN", "title_G" and "title_N" is smaller as compared to that of "The", "of", Guns and Navarone, respectively.

An apparatus for contextual matching on the corpus of documents is described that comprises a data processor arranged to execute queries to find terms in context in the corpus of documents. Memory readable by the data processor stores an index structure. The index structure maps entries in the index structure to documents in the corpus. The entries in the index structure represent words by for example including tokens that identify the corresponding words, where the term "word" used herein refers to characters and character strings whether or not they represent a proper word in a linguistic sense, found in the corpus of documents and indexed by the index structure. In addition, some entries in the index structure represent marks on words found in the corpus. Entries that represent marks on words comprise tokens coalesced with prefixes of respective marked words. The prefixes comprise one or more leading characters of the respective marked words. The entries representing marks on words preferably include specialized tokens with disambiguating features, to distinguish them from tokens representing words found in the corpus. The data processor includes a query processor which forms a modified query by adding to or substituting for a word in a subject phrase with a search token representing a mark coalesced with a prefix of the marked word in the subject phrase. The processor executes the modified query using the index structure, and returns results comprising a list of documents that satisfies the query, and optionally locations within the documents for the phrases that satisfy the query.

In embodiments of the system, the prefixes that are coalesced with a mark comprise the leading N characters of the marked word, where N is three or less. Substantial improvements in performance are achieved where N is equal to one. Typically, tokens are made using a mark coalesced with the leading N characters of the next word or preceding word, where the next word or preceding word includes more than N characters, so that the prefix does not include all of the adjacent word.

Representative embodiments create special tokens for the coalesced marks by combining code indicating characters in the mark with code indicating characters in the prefix, and a code indicating that the entry is a coalesced entry that disambiguates the entry from normal words.

An apparatus for indexing a corpus of documents is described as well, which creates and maintains the index structure described above. Thus, a system comprising a data processor arranged to parse documents in the corpus of documents to identify words and locations of words found in the documents, and mark words according to a pre-selected set of marks, in the documents is described. The processor creates and/or maintains an index structure including entries representing words found in the corpus of documents and mapping entries in index structure to locations in documents in the corpus. The apparatus includes memory storing the index structure that is writable and readable by the data processor. An indexing processor is also included that identifies words in context in a set of words found in the documents in the corpus. For words identified in context or in contexts in the documents, entries are added to the index structure representing the marks for the words, including tokens coalesced with prefixes of respective marked words, as described herein.

Data processing methods are provided which include storing an index structure as described above on a medium readable by a data processor, modifying an input phrase query to form a modified phrase query by adding to or substituting for a word found in a subject phrase, a search token representing the mark coalesced with the prefix of the marked word in the subject phrase, and executing the modified query. Likewise, data processing methods are provided which include parsing documents in the corpus of documents to identify words and locations of words in the documents, and to create entries in an index structure as described herein. The index structure is stored in memory writable and readable by the data processor.

A set of word characteristics are identified that are desirable for matching with the query processor, and marks provided for the word characteristics in the set. Words identified to have a characteristic, such as context, in the set of word characteristics are found in the documents in the corpus, and entries are added to the index structure representing the marks, by including tokens for the words coalesced with prefixes as described herein.

The technology described herein can also be implemented as an article of manufacture comprising a machine readable data storage medium, storing programs of instructions executable by a processor for performing the data processing functions described herein.

Other aspects and advantages of the present invention can be seen on review of the drawings, the detailed description and the claims, which follow.

BRIEF DESCRIPTION OF THE DRAWINGS

FIG. 2 illustrates an example document.

FIG. 3 illustrates another example document.

DETAILED DESCRIPTION

A detailed description of embodiments of the present invention is provided with reference to the FIGS. 1-6.

Figure 1:
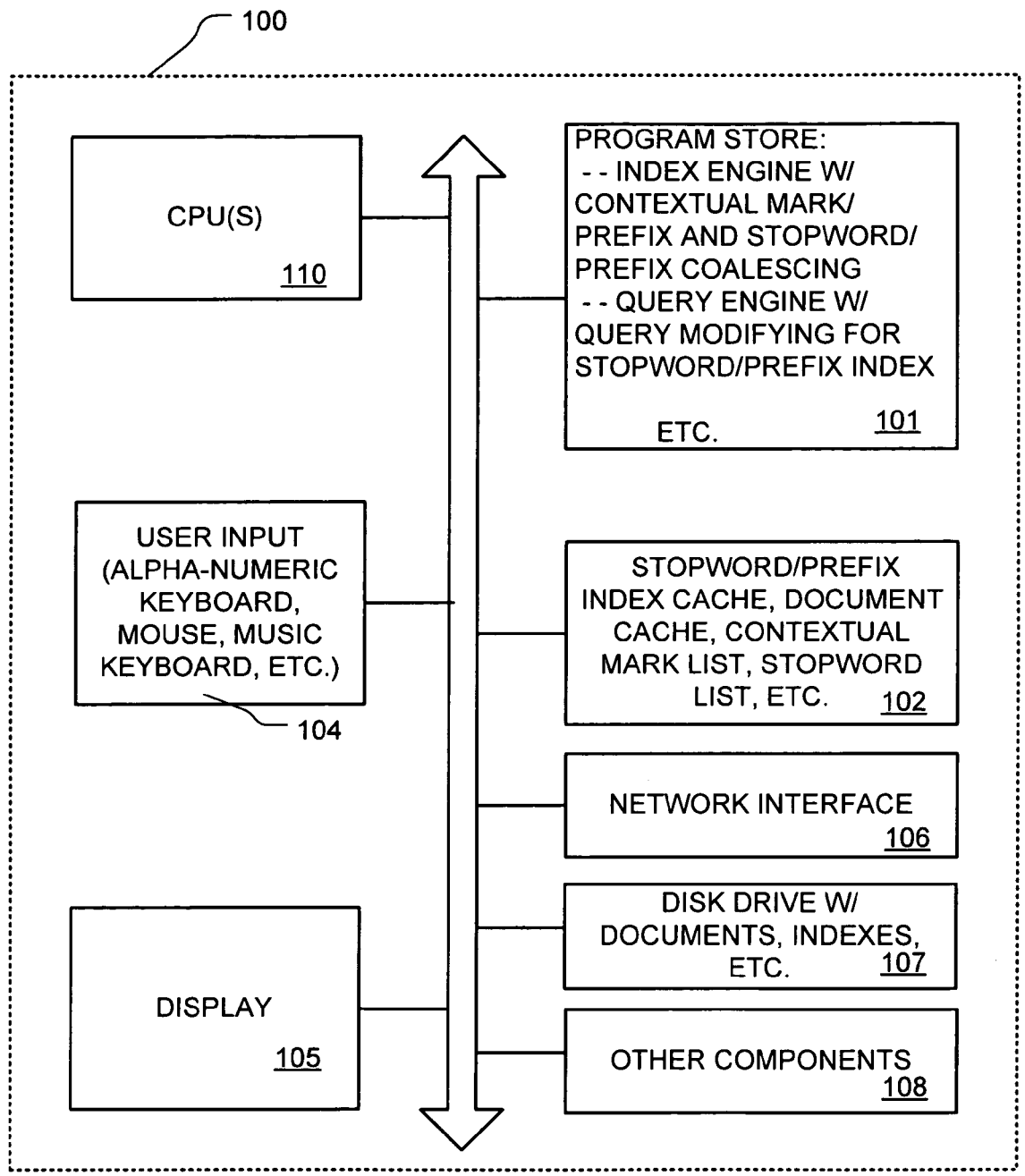
FIG. 1 is a simplified block diagram of a computer system arranged as an apparatus for finding phrases in a corpus of document.

FIG. 1 is a simplified block diagram representing a basic computer system configured as a search engine dedicated to the search and retrieval of information for the purpose of cataloging the results. The search engine includes a document processor for indexing and searching a corpus of documents for finding phrases, including data processing resources and memory storing instructions adapted for execution by the data processing resources. The data processing resources of the computer system 100 include one or more central processing units CPU(s) 110 configured for processing instructions, program store 101, data store 102, user input resources 104, such as an alpha-numeric keyboard, a mouse, and so on, a display 105, supporting graphical user interfaces or other user interaction, a network interface 106, a mass memory device 107, such as a disk drive, or other non-volatile mass memory, and other components 108, well-known in the computer and document processing art. The program store 101 comprises a machine-readable data storage medium, such as random access memory, nonvolatile flash memory, magnetic disk drive memory, magnetic tape memory, other data storage media, or combinations of a variety of removable and non-removable storage media. The program store 101 stores computer programs for execution by the CPU(s) 110, configuring the computer system as a search engine. Representative programs include an index processor for generating and maintaining an index structure with entries using tokens made by mark/prefix coalescing, including stop word/prefix coalescing. The program store also includes a query processor including resources for modifying queries for use of the token mark/prefix coalescing in the index structure. The data store 102 comprises a machine-readable data storage medium configured for fast access by the CPU(S) 110, such as dynamic random access memory, static random access memory, or other high speed data storage media, and stores data sets such as a stop word lists, mark lists and data structures such as an index cache and a document cache, utilized by the programs during execution. The mass memory 107 comprises nonvolatile memory such as magnetic disk drives and the like, and stores documents from a corpus of documents, indexes used by the search engine, and the like.

For a corpus of documents, a stop word list is defined, including common words (e.g., prepositions and articles) that usually have little or no meaning by themselves. In the English language examples include "a", "the", "of" etc. Stop word lists may be defined by linguistic analysis independent of a corpus of documents, or alternatively defined by analysis of a corpus of documents to identify the most commonly used words. The size of the stop word list can be adjusted according to the needs and use of a particular search engine. For electronic documents including tags delineated by special characters such as "<" and ">", a special character or combination of special characters could be treated as a stop word, and included in a stop word list.

Also, for a corpus of documents, a list of other types of marks is defined, including marks that represent contexts that are chosen as suits a particular application of the search engine, and the nature of the corpus of documents. Representative marks include contextual marks for document fields, contextual marks for words used in entity. names, contextual marks for words used in grammatical contexts, contextual marks for words used as tags or as parts to tags in electronic documents, and so on. The number of marks and the types of marks can be adjusted according to the needs and use of the particular search engine.

Figure 4:
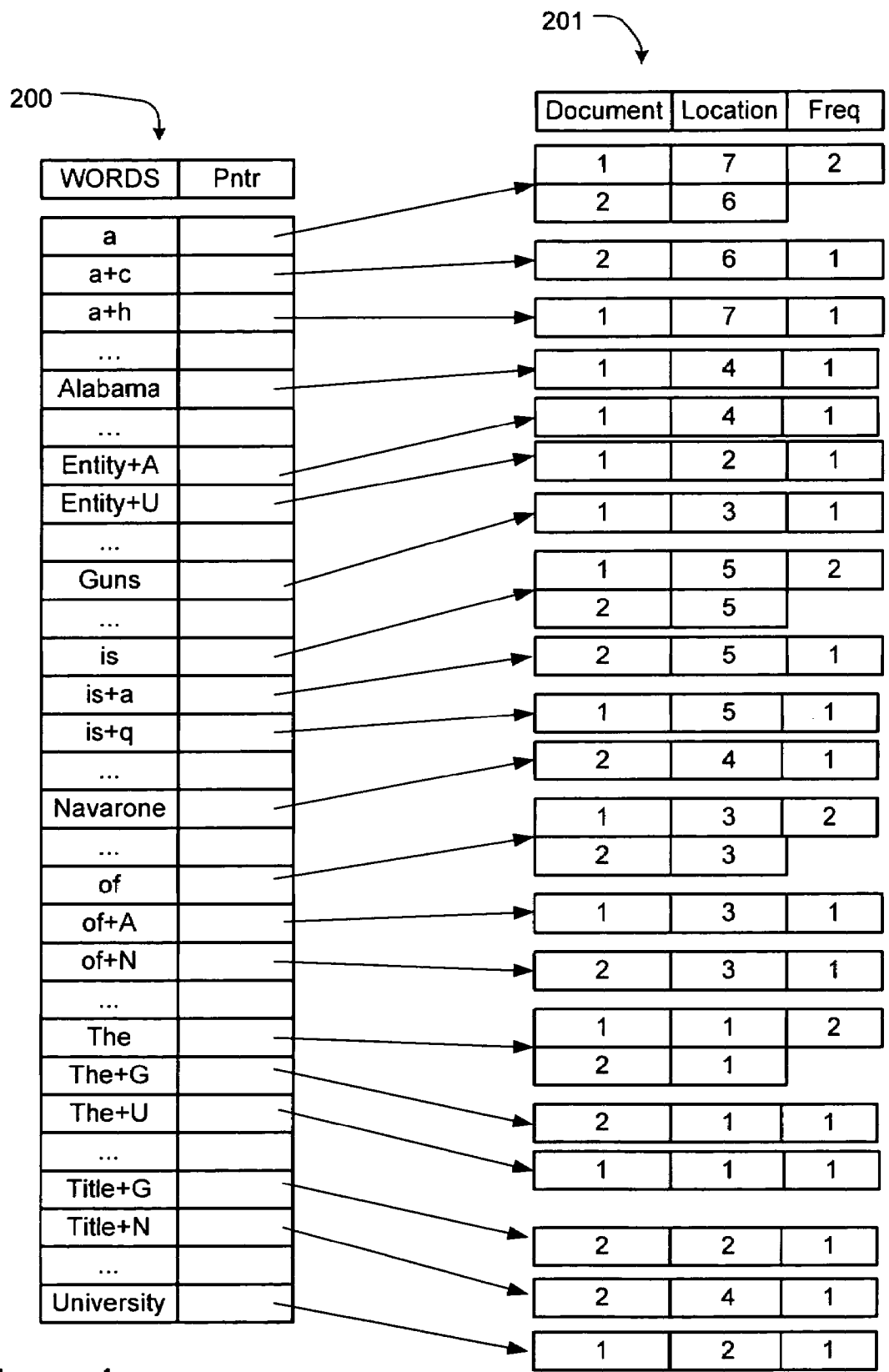
FIG. 4 illustrates an index structure with contextual and stop word marks coalesced with prefixes of next words.

FIGS. 2-4 illustrate example documents and an index structure comprising a reverse index and dictionary with marks including stop words for the example documents.

FIGS. 2 and 3 represent two documents in a corpus for the search engine. Document 1, illustrated in FIG. 2, contains the text "The University of Alabama is quite a huge college" and Document 2, illustrated in FIG. 3, contains the text "The Guns of Navarone is a classic." The superscripts (1-9 in Document 1 and 1-7 in Document 2) indicate the locations of the words in the respective documents.

A corpus of documents for a search engine can comprise a collection of documents represented by a dictionary/index structure. A corpus of documents can include documents stored on a single disk drive, documents accessible by a local network, documents in a library, documents available via a public network, documents received at a search engine from any source, or other collections associated by the index structure of the search engine, or accessible for the purposes of generating such structures. Documents include web pages, or other electronic documents, expressed in languages such as HTML and XML, text files expressed in computer languages such as ASCII, specialized word processor files such as ".doc" files created by Microsoft Word, and other computer readable files that comprise text to be indexed and searched.

FIG. 4 illustrates an index structure comprising a dictionary 200 and a reverse index 201 (also called an inverted index). The dictionary 200 contains entries representing all the unique words and marks in the index. The entries include tokens identifying the words and the marks, where the tokens comprise computer readable codes, such as ASCII characters for the letters in the words and the marks. The entries also included pointers to the locations of the data for the words and for the marks in the inverted index. The dictionary 200 and reverse index structure 201 are partially filled to simplify the drawing.

For each entry in the dictionary 200, the reverse index 201 contains the document number or numbers identifying documents in the corpus, and the location or locations of words, the location or locations of words corresponding with, or marked by, marks, in the corresponding documents. In some embodiments, the index includes a parameter for each entry indicating the frequency of the word in the corpus, or alternatively, a parameter set for each entry indicating the frequency of the word in the corresponding documents.

The phrase, "University of Alabama", is an entity name; and the phrase, "Guns of Navarone"; is a title. Thus, the words "University" and "Alabama" are processed during parsing, and identified as having the characteristic of being in an entity name context. The words "Guns" and "Navarone" are processed during parsing, and identified as having the characteristic of being in a title context. Tokens for the marks on "University", such as "entity+U" and for the mark on "Alabama", such as "entity+A" are added to the index with the same location data as the entries for the words "University" and "Alabama", respectively. Also, entries including the tokens for the marks on "Guns" and "Navarone", such as "title+G" and "title+N", are added to the index with the same location data as the entries for the words, "Guns" and "Navarone", respectively.

The stopwords "a", "is", "the", "of" are processed further for the dictionary and reverse index. In particular, entries are included in the dictionary comprising artificial tokens formed by coalescing the stopwords with a first character, or prefix of length N characters, from the respective next words in the document. In the example, a token is added to the entry for the stop word "a", by using the stop word coalesced with a prefix comprising the first character of respective next words "classic" from Document 2, and "huge" from Document 1. Likewise, the tokens for stop word "of" are made by coalescing the stop word with a prefix comprising a first character of the respective next words "Alabama" from Document 1, and "Navarone" from Document 2. The stop word "is" is coalesced with a prefix comprising a first character of the respective next words "a" from Document 1, and "quite" from Document 2 to make tokens for corresponding entries. The stop word "The" is coalesced with a prefix comprising a first character of the respective next words "Guns" from Document 2, and "University" from Document 1 to make tokens for corresponding entries.

The tokens may comprise the stop word concatenated with a disambiguating feature, such as a character or character string (for example, a "+" symbol as shown here), or mark which may or may not include a disambiguating feature, concatenated with the prefix of the next word. In other embodiments the disambiguating feature may comprise a string of codes for letters such as for the letters "xxzz", or a string of letters and punctuation such as "x#@Xz".

The length N of the prefix is 1 in a preferred embodiment. In other embodiments, the length N is 2. In yet other embodiments the length N is 3. Further, the length N can be made adaptive, so that it is adapted for different stopwords in the same corpus or for efficient performance across a particular corpus. It is unlikely that prefixes of length greater than 3 will be required for performance improvements for corpora having sizes expected in the reasonable future. Although embodiments described here apply coalescing with the prefix of a next word or a marked word, some special characters treated as stopwords, for example, could be coalesced with a prefix of a previous word. For example, a closing character, such as punctuation like a close quotation mark, or a ">" which delineates the end of a tag in some markup languages, can be coalesced with a prefix of a previous word for the purpose on indexing and searching.

If the next word has fewer characters than N, then the entire next word is concatenated with the disambiguating symbol and the first word. Typically, the next word includes more than N characters. Also, if a stop word appears at the end of a sentence or is otherwise hanging, the stop word can be coalesced with the following punctuation (e.g., a period or semicolon) or with other characterizing data suitable for searching.

As can be seen from this small example, the entries comprising coalesced tokens distribute the data for the marks, and aid in fast querying.

In the illustrated embodiment, the coalesced tokens are combined with normal words in a single "flat" dictionary with a reverse index for locating words corresponding to the entries in the dictionary in specific documents. Other embodiments include providing one or more additional dictionary/index pairs for the coalesced stopwords, accessed only for phrase queries including stopwords. The index structure can be configured in a wide variety of ways, depending on the corpus being analyzed, the characteristics of searches being used, the memory availability of the search engine, the speed requirements, and so on: In embodiments of the invention, the index structure may comprise a skip list.

An index processor in the search engine which comprises data sets, such as stop word lists, mark lists and a cache of documents in a corpus, data structures such as reverse index structures, and computer instructions executable by a processing unit, analyzes a document corpus and generates a dictionary and index such as that illustrated in FIG. 4. The index processor may perform the analysis over a set of documents in one processing session, and may analyze one document, or a part of a document, at a time as such document is added to the corpus.

Figure 5:
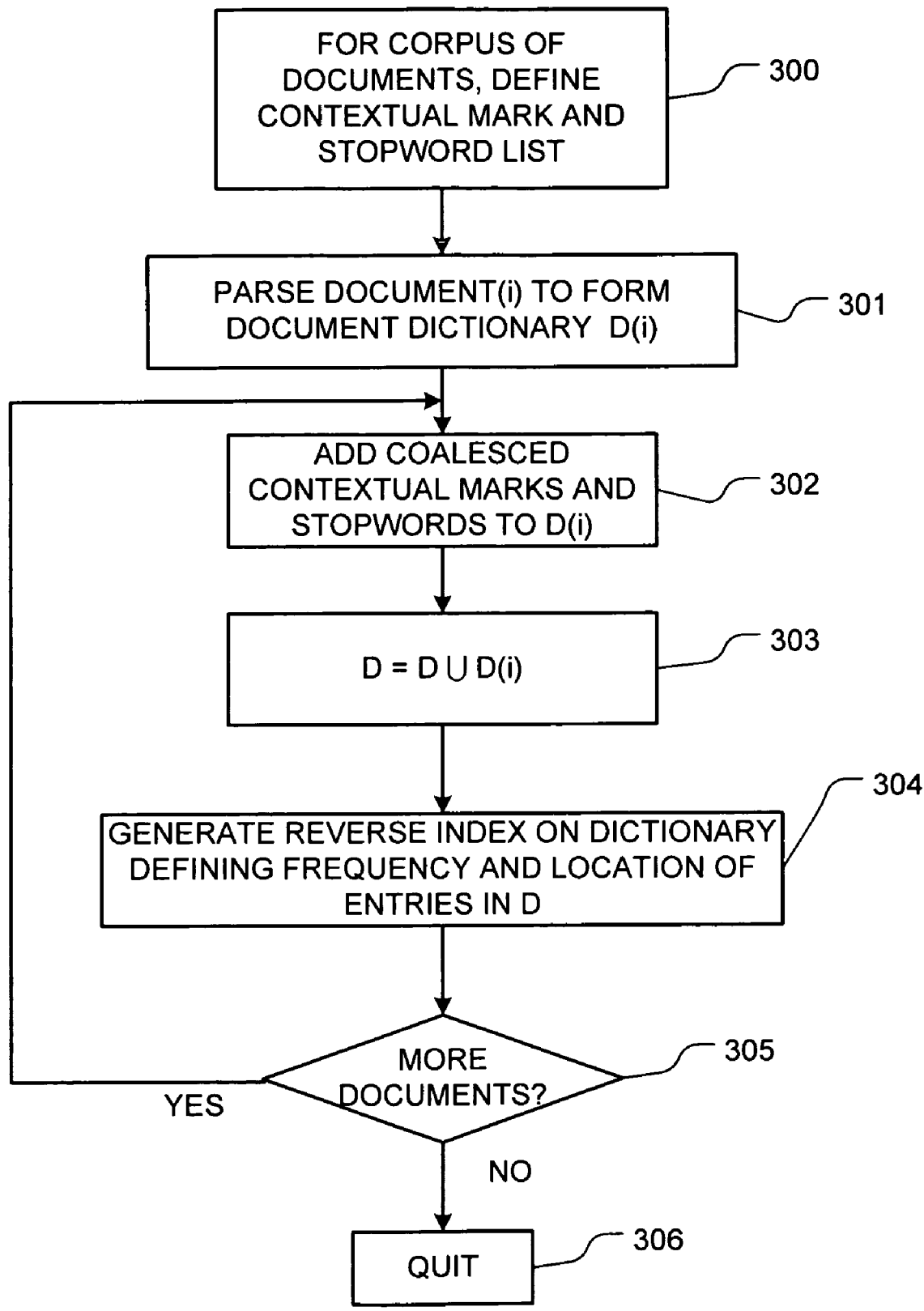
FIG. 5 is a simplified flow chart for an index processor.

Basic processing steps executed by such an index processor are illustrated in FIG. 5. As indicated by step 300, a one or more mark lists, are stored for a corpus of documents. The mark lists as mentioned above can be defined based on linguistic analysis and contextual analysis for each language and document type subject of the index processor. Alternatively, the mark lists can be generated by analysis of the corpus of documents. Also, a combination of linguistic analysis and document analysis may be applied for generation of the mark list. In the illustrated example, the index processor parses each document (DOCUMENT (i)) to form a document dictionary D(i) (block 301). Next, entries including coalesced tokens for marks as described above are added to the document dictionary D(i) (block 302). In some embodiments, marks may represented by tokens without coalescing the mark with a prefix of the marked word. The dictionary D for the corpus is updated by the union of the set of words in the corpus dictionary D with the set of words in the document dictionary D(i) (block 303). The set of words in the corpus dictionary D can be an empty set at the beginning of an analysis, or may comprise a large number of words determined from analysis of previous documents. The index processor then generates, or updates in the case of adding documents to an existing document dictionary, a reverse index on the dictionary defining the frequency and location of the words corresponding to the entries in the corpus dictionary D (block 304). The processor then determines whether there are more documents to be analyzed (block 305). If there are more documents, then the process loops to step 301, and parses and analyzes the next document. If there are no more documents for analysis at step 305, the indexing processor stops (block 306). It will be appreciated that the order and grouping of the execution of the processing steps shown in FIG. 5 can be rearranged according to the needs of particular implementation.

The basic indexing procedure corresponding with steps 301 and 302 can be understood with reference to the following pseudo-code:

```
Indexing (Document D)
{
    FOR EACH word W in Document D
    {
        IF (W is a stopword) THEN
        {
            Read first character of word W+1 into C
            Artificial Word W' = Concatenate W and C
            Store W' in index structure
            Store W in index structure
        }
        ELSE
        {
            Store W in index structure
        }
    }
}
```

The above pseudo-code describes a process that operates on words parsed from a document. For each word W, the process determines whether the word is found in the stop word list. If the word is a stop word, then the first character of the following word (W+1) is stored as parameter C. Then, the artificial word W' is created by concatenating the word W with C. The token representing the artificial word W' is then stored in the index structure. Next, the token representing the word W is also stored in the index structure. Not stated in the pseudo-code is a step of associating with the index structure, the token representing the artificial word W' with the location of the corresponding stop word W. The location information is associated with words and artificial words using data structures which are part of the index structure, and can be general, such as a document identifier in which the corresponding stop word W is found, or can be more specific, such as a specific word position in a specific line within a specific document. The format of data structure used in the index structure to associate the location information with the corresponding stop word W, and with the artificial word W', association can take many styles known in the computer programming art.

The pseudo-code above is applied to stop word coalescing. The code is modified for mark coalescing in a straightforward manner, as follows:

```
Indexing (Document D)
{
    FOR EACH word W in Document D
    {
        IF (W is a contextual match on mark M) THEN
        {
            Read first character of word W+1 into C
            Artificial Word W* = Concatenate M and C
            Store W* in index structure
            Store W in index structure
        }
        ELSE
        {
            Store W in index structure
        }
    }
}
```

Again location information that specifies the location of the marked word W is associated with the token representing the mark W* in the index structure in the manner discussed above with respect to stopwords.

A query processor in the search engine which comprises data sets, such as mark lists, data structures such as reverse index structures, and computer instructions executable by a processing unit, analyzes a query and generates a modified query if the phrase query includes a stop word or a contextual parameter, and then executes the modified query and returns results.

Figure 6:
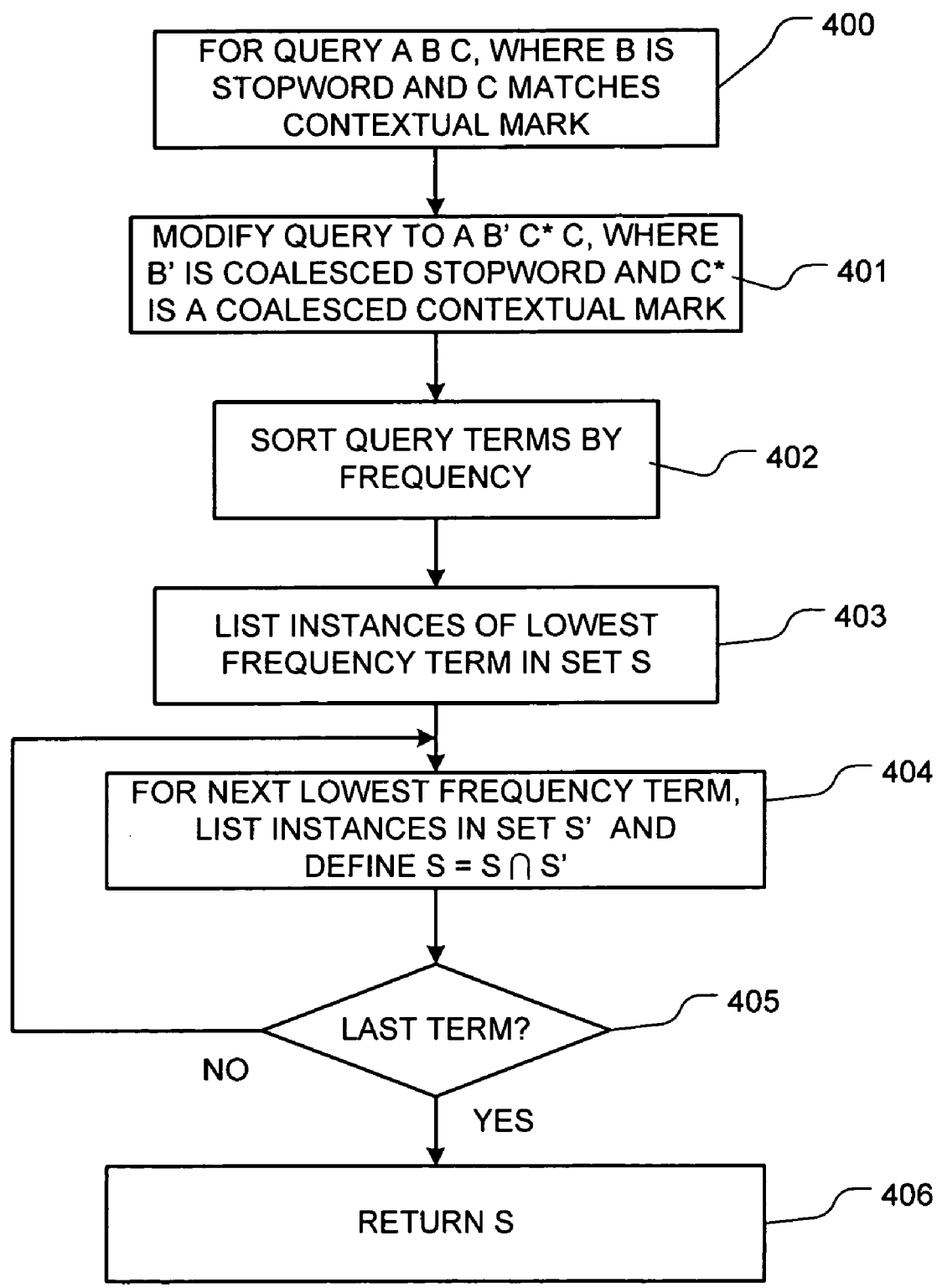
FIG. 6 is a simplified flow chart for a query processor.

Basic processing steps executed by such a query processor are illustrated in FIG. 6. The query processor begins with an input phrase query "A B C", where for this example the word B is a stop word and C is a contextual match on mark M (block 400). Next, the query is modified to the form "A B' C* C" where the term B' represents a coalesced stop word mark and C* represents the coalesced context mark, as described above (block 401). The query processor may then sort the query terms by frequency in the document corpus based on analysis of the dictionary (block 402). Next, instances of the lowest frequency term in the corpus are listed in a set of instances S (block 403). Then for a next term in the query, instances in the corpus are listed in a set S', and the lists are merged, so that the set of instances S is defined as the intersection of the set S and the set S' (block 404). The processor then determines whether the last term in a query has been processed (block 405). If there are additional terms in the query to be processed, then the processor loops back to block 404 where a list of instances for the next term is generated and merged with the set S. If at block 405 there are no more terms to be analyzed in the query, then the set S is returned as the result of the query (block 406).

At query time, if the phrase query contains stopwords, the query is preprocessed and the stopwords are converted into their corresponding stop word marks, corresponding with blocks 400 and 401 of FIG. 6. This process can be understood with reference to the following pseudo-code:

```
Process Query (Phrase Query Q)
{
    IF (Q contains stopwords) THEN
    {
        FOR EACH stopword W IN Q
        {
            Read first character of word W+1 into C
            Artificial Word W' = Concatenate W and C
            Replace W with W' in Q
        }
    }
    Process Phrase Query (Q)
}
```

The above query processing pseudo-code describes a process which operates on queries received by the search engine. For each query Q, the process determines whether it contains a stop word. If it contains a stop word, then for each stop word W in the query Q, the first character of the next word W+1 in the query is stored as a parameter C. Then, an artificial word W' is created by concatenating W with the parameter C. The artificial word W' is used in the query in place of the stop word W. Alternatively, entries for both the artificial word W' and the stop word W may be kept in the query. Finally, the query as modified is processed.

The pseudo-code above is applied to phrase modification for stop word mark coalescing. The code is modified phrase modification for context mark coalescing in a straightforward manner, as follows:

```
Process Query (Phrase Query Q)
{
    IF (Q contains contextual match on mark M) THEN
    {
        FOR EACH contextual match W on mark M in Q
        {
            Read first character of word W+1 into C
            Artificial Word W* = Concatenate M and C
            Add W* into Q
        }
    }
    Process Phrase Query (Q)
}
```

Technology described above comprises the following computer implemented components:
1. A list of all marks identified by the system.
2. An algorithm during indexing that create entries in the index with tokens made by coalescing marks with the first characters of the marked or adjacent words.
3. An algorithm at query time, for phrase queries only, that checks if any marks are contained in the query. If yes, stop word marks are changed to the corresponding artificial words, and for context marks the corresponding artificial words are added to the query, and the query is executed normally.
4. Processes for returning results correctly.

The invention consists of a mechanism for significantly speeding up phrase queries involving frequently occurring words in a search engine. The describe solution creates tokens for the index and for queries by coalescing marks in a novel way that significantly speeds up evaluation of phrase queries containing stopwords and marks, while simultaneously reducing the number of unique words. The technique described in this application supports a variety of useful advanced querying features for contextual matching. For an additional example, the input stream may look like the following based on using a named entity extractor as a preprocessor:

{entity_person Bush} grew up in {entity_city Edison}

The individual tokens, including words (like "Bush") and marks (like "entity_person"), ignoring the braces, are then indexed. The marks would likely be distributed in the corpus like stopwords in that they would be extremely frequent in the input stream and so can be treated similarly, by for example coalescing the mark with the prefix of the marked word. A search for Bush as a person can be then be treated as search for the phrase "entity_person B Bush" and receive the same treatment as other phrase searches.

In particular, the input token stream can be transformed into the following stream and indexed:

entity_person_B Bush grew up in entity_city_E Edison

This would allow searching for Bush where Bush is person and for Edison where Edison is a city, using the following transformed query terms:

entity_person_B Bush
entity_city_E Edison

The various optimizations related to the number of prefix characters in the actual word and to adapting automatically to the best number of and even a variable number of prefix characters can be applied. In some cases, the value of doing adaptive and variable length prefixes may be even greater than for some categories of marks than with stop word containing phrase searches.

The generalized technique can be applied to a variety of features or attributes or properties of the words or their surrounding context. Besides associating words with entity types as in the above example, marks can be used to capture other linguistic properties including noun case and verb tense.

e.g. The {subject man} kicked the {object ball}

In this case, the phrases can be transformed for example to the following form:

The subject_m man kicked the object_b ball

Another application is to use tags to indicate special fielded data in the same stream. Note in this example the stop word treatment is happening in combination with mark associations.

e.g. {title The Man of La Mancha} title_T Them title_M Man title_o of title_La title_M Mancha

The marking procedure can be applied to generate multiple marks per word, which can address words and stopwords that meet more than one type of contextual match. For example, for a book entitled "The Life of Lyndon Johnson", the index processor, depending on the querying features being optimized, can create some or all of the following tokens to be used as entries in the index:

TheL
title_TheL
title_The
The
title_Life
Life
ofL
title_ofL
title_o
of
name_Lyndon Johnson
title_
title_Lyndon
name_Lyndon title_J title_Johnson name_J Johnson This technique enables uniform treatment of a number of features including supporting a wide range of linguistically sophisticated queries. The benefit to the implementation is that the need to create secondary indexes for auxiliary features of the text is obviated. Essentially this technique intelligently distributes tags across the buckets of a single index.

We have obviated the need for a secondary index by smartly distributing the 'primary index' buckets.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An apparatus for contextual match in a corpus of documents, comprising:
   a data processor arranged to execute queries to match words in the corpus of documents;
   memory storing an index structure readable by the data processor, the index structure mapping entries in the index structure to locations of words in the documents in the corpus, the index structure including entries representing words found in the corpus of documents, and entries representing marks which identify a characteristic of corresponding marked words, and wherein one or more entries representing marks include fewer, if any, than all of the characters of the corresponding marked words;
   wherein the data processor includes a query processor which modifies a subject query to form a modified query adapted to use the entries representing marks, and executes the modified query using said index structure;
   wherein at least one entry representing a mark in the index structure comprises a token representing a type of mark coalesced with a prefix of a corresponding marked word, the prefix comprising one or more leading characters of the corresponding marked word.

2. The apparatus of claim 1, wherein the prefix comprises N leading characters of the marked word, and N is 3 or less.

3. The apparatus of claim 1, wherein the prefix comprises N leading characters of the marked word and N is 1.

4. The apparatus of claim 1, including an index processor which processes documents in the corpus to generate said index structure.

5. The apparatus of claim 1, wherein the index structure comprises a dictionary and a reverse index including said entries.

6. The apparatus of claim 1, wherein the characteristic identified by at least one mark includes a context of the corresponding marked word.

7. The apparatus of claim 1, wherein the corpus includes stopwords, and index structure includes entries representing marks that identify the corresponding marked words as stopwords, and wherein the entries representing marks that identify the corresponding marked words as stopwords comprise tokens coalesced with prefixes of adjacent words adjacent to the corresponding marked words, the prefixes comprising one or more leading characters of the respective adjacent words.

8. A method for finding phrases in a corpus of documents using a data processor, wherein the words in the corpus of documents include a set of stopwords, comprising:
   storing an index structure on a medium readable by the data processor, the index structure mapping entries in the index structure to documents in the corpus, the index structure including entries representing words found in the corpus of documents associated with locations of the words in the documents, and entries representing marks which identify a characteristic of corresponding marked words associated with locations of the marked words in the documents, and wherein one or more entries representing marks include fewer, if any, than all of the characters of the corresponding marked words;
   modifying an input phrase query provided to the data processor to form a modified query by adding a mark corresponding to a word in a subject phrase; and
   executing the modified query using said index structure and the data processor;
   wherein at least one entry representing a mark in the index structure comprises a token representing a type of mark coalesced with a prefix of a corresponding marked word, the prefix comprising one or more leading characters of the corresponding marked word.

9. The method of claim 8, wherein the prefix comprises N leading characters of the marked word, and N is 3 or less.

10. The method of claim 8, wherein the prefix comprises N leading characters of the marked word, and N is 1.

11. The method of claim 8, including processing documents in the corpus to generate said index structure.

12. The method of claim 8, wherein the index structure comprises a dictionary and an inverted index including said entries.

13. The method of claim 8, wherein the characteristic identified by at least one mark includes a context of the corresponding marked word.

14. The method of claim 8, wherein the index structure includes entries representing stopwords in the corpus including tokens coalesced with prefixes of respective adjacent words adjacent to the stopwords, the prefixes comprising one or more leading characters of the respective adjacent words.

15. An apparatus for indexing a corpus of documents, wherein the words in the corpus of documents include a set of words having a characteristic to be subject of queries, comprising:
    a data processor arranged to parse documents in the corpus of documents to identify words found in the documents and locations of the words in the documents, and to create an index structure including entries representing words found in the corpus of documents mapping entries in the index structure to locations of the words in documents in the corpus
    memory storing the index structure writable and readable by the data processor; wherein the data processor includes an indexing processor which indentifies words in a set of words having a characteristic represent d by a mark in a set of marks, and add entries in the index structure representing marks for the identified the set mapping the marks to the locations of the identified words, and wherein one or more entries representing marks include fewer, if any, than all of the characters of the corresponding identified words;
    wherein entries in the index structure representing the marks comprise tokens coalesced with prefixes of respective marked words, the prefixes comprising one or more leading characters of the respective marked words.

16. The apparatus of claim 15, wherein the prefix comprises N leading characters of the marked word, and N is 3 or less.

17. The apparatus of claim 15, wherein the prefix comprises N leading characters of the marked word, and N is 1.

18. The apparatus of claim 15, wherein the index structure comprises a dictionary and a reverse index including said entries.

19. The apparatus of claim 15, wherein the characteristic identified by at least one mark includes a context of the marked word.

20. The apparatus of claim 15, wherein the indexing processor identifies stopwords in the set of words found in documents in the corpus, and adds entries in the index structure representing marks for the stopwords, the entries representing marks for the stopwords comprising tokens coalesced with prefixes of respective adjacent words adjacent to the stopwords, the prefixes comprising one or more leading characters of the respective adjacent words.

21. A method for finding phrases in a corpus of documents using a data processor, wherein the words in the corpus of document: include a set of stopwords. comprising:
    parsing documents in the corpus of documents using the data processor to identify words found in the documents and the locations of the words in the documents, and adding entries representing words found in the corpus of documents to an index structure mapping entries in the index structure to documents in the corpus;
    storing the index structure in memory writable and readable by the data processor; and
    identifying identifies words in a set of words having a characteristic represented by a mark in a set of marks found in documents in the corpus, and adds entries in the index structure representing marks for the identified words in the set mapping the marks to the locations of the identified words, and wherein one or more entries representing marks include fewer, if any, than all of the characters of the corresponding identified words;
    wherein the entries in the index structure representing marks comprise tokens coalesced with prefixes of respective marked words, the prefixes comprising one or more leading characters of the respective marked words.

22. The method of claim 21, wherein the prefix comprises N leading characters of the marked word, and N is 3 or less.

23. The method of claim 21, wherein the prefix comprises N leading characters of the marked word, and N is 1.

24. The method of claim 21, wherein the index structure comprises a dictionary and an inverted index including said entries.

25. The method of claim 21, wherein the characteristic identified by at least one mark includes a context of the marked word.

26. The method of claim 21, including identifying stopwords in the set of words found in documents in the corpus, and adding entries representing marks in the index structure for the stopwords the entries representing marks for the stopwords comprising tokens coalesced with prefixes of respective adjacent words adjacent to the stopwords, the prefixes comprising one or more leading characters of the respective adjacent words.

27. An article of manufacture for use with a data processor for finding phrases in a corpus of documents, wherein the words in the corpus of documents include a set of stopwords, comprising:
    a machine readable data storage medium, instructions stored on the medium executable by the data processor to perform the steps of:
    parsing documents in the corpus of documents using the data processor to identify words found in the documents and the locations of the words in the documents, and adding entries representing words found in the corpus of documents to an index structure mapping entries in the index structure to documents in the corpus;
    storing the index structure in memory writable and readable by the data processor;
    identifying words in a set of words having a characteristic represented by a mark in a set of marks found in documents in the corpus, and adding entries in the index structure representing marks for the identified words in the set mapping the marks to the locations of the identified words, and wherein one or more entries representing marks include fewer, if any, than all of the characters of the corresponding identified words;
    modifying an input phrase query provided to the data processor to form a modified query by adding a mark corresponding to a word found in a subject phrase; and
    executing the modified query using said index structure and the data processor;
    wherein at least one entry in the index structure representing a mark in the index structure comprises a token representing a type of mark coalesced with a prefix of a corresponding marked word, the prefix comprising one or more leading characters of the corresponding marked word.

* * * * *